US006778511B1

United States Patent
Magnus et al.

(10) Patent No.: US 6,778,511 B1
(45) Date of Patent: Aug. 17, 2004

(54) POWER CONTROL METHOD AND A RADIO SYSTEM

(75) Inventors: Almgren Knut Magnus, Sollentuna (SE); Olofsson Håkan Gunnar, Stockholm (SE); Svanbro Krister, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 787 days.

(21) Appl. No.: 09/662,549

(22) Filed: Sep. 15, 2000

(30) Foreign Application Priority Data

Sep. 17, 1999 (SE) .......................................... 99033649

(51) Int. Cl.⁷ ................................................. H04Q 7/00
(52) U.S. Cl. .................... 370/328; 370/342; 370/343; 370/345; 455/422; 455/522
(58) Field of Search ................................ 370/203, 310, 370/328, 342, 343, 345, 449; 455/403, 422, 522

(56) References Cited

U.S. PATENT DOCUMENTS

| | | | | |
|---|---|---|---|---|
| 5,574,747 A | * | 11/1996 | Lomp | 375/144 |
| 5,604,766 A | | 2/1997 | Dohi et al. | |
| 5,852,782 A | * | 12/1998 | Komatsu | 455/522 |
| 5,943,610 A | * | 8/1999 | Endo | 455/69 |
| 5,991,329 A | * | 11/1999 | Lomp et al. | 375/130 |
| 6,389,296 B1 | * | 5/2002 | Shiraki et al. | 455/522 |

FOREIGN PATENT DOCUMENTS

| | | |
|---|---|---|
| EP | 0682419 A2 | 11/1995 |
| WO | WO 97/26716 A2 | 7/1997 |
| WO | WO 98/23044 A2 | 5/1998 |
| WO | WO 98/51026 A1 | 11/1998 |

OTHER PUBLICATIONS

Almgren Power control in a cellular system. Vehicular Technology Conference, 1994 IEEE 44th, Jun. 8–10, 1994 pp.: 833–837 vol. 2.*
International Search Report dated Jan. 8, 2001.

* cited by examiner

*Primary Examiner*—Hassan Kizou
*Assistant Examiner*—Dmitry Levitan

(57) ABSTRACT

The present invention relates to methods of controlling transmitting power in a cellular radio communication system comprising one or several base stations each communicating with mobile terminals located within its respective area of coverage in which method the desired power change is calculated by means of an adaptive algorithm. Power drift between the desired output power and actually used output power is reduced by making the algorithm reduce the influence of the previously used output power by multiplying it with a "forgetting function" λ with values between 0 and 1. At the receiving end is a decision made whether the received power order commands are reliable or not by checking the soft value of the power order commands. This proposed power control algorithm provides a delta-modulated fast power control method which is robust to errors in the signalling channel and at the same time reacts quickly to fast fading variations.

10 Claims, 4 Drawing Sheets

POWER CONTROL METHOD AND A RADIO SYSTEM

This application claims priority under 35 U.S.C. §§119 and/or 365 to 9903364-9 filed in Sweden on Sep. 17, 1999; the entire content of which is hereby incorporated by reference.

TECHNICAL FIELD OF THE INVENTION

The present invention relates generally to methods of controlling transmitting power in a cellular radio communication system. More particularly the invention relates to a fast, robust and adaptive power control method.

The invention also relates to an arrangement for carrying out the method.

DESCRIPTION OF RELATED ART

The capacity of CDMA (Code Division Multiple Access) systems is interference limited since the channels are neither separated in frequency nor separated in time. A single user exceeding the limit on transmitted power could, in a surrounding area, inhibit the communication of all other users. Thus, power control is very important in interference limited systems such as CDMA or wideband-CDMA.

The power control systems have to compensate not only for signal quality variations due to a varying distance between base station and mobile terminal, but must also attempt to compensate for signal quality variations typical of a wireless channel. These variations are due to the changing propagation environment between the base station and the mobile terminal as the mobile terminal moves across the cell or as some elements in the cell move. There are basically two types of channel variations, slow fading and fast fading.

Several proposals have been made to mitigate these two types of fading in CDMA systems. A well-known prior art power control method is that which is found in interim standard 95 (IS-95) systems. The IS-95 reverse link power control mechanism consists of two parts, open loop power control and closed loop power control. The open loop power control is used to adjust the mobile terminals' transmitting power based on the received power from the base station. Assuming that the radio environment is reciprocal in both forward and reverse link, the mobile terminal adjusts its reverse link transmission power according to the received power on the forward link, i.e. if the received power is for example 5 dB lower than expected, the mobile terminal raises its output power with 5 dB which is a good estimate of the path loss on the reverse link.

However, because of the frequency separation between reverse and forward links, the fast fading of the two links are independent. To account for this difference and to further control the mobile terminals' transmit power, closed loop power control is used. In the closed loop power control mechanism, the base station demodulates the reverse link and determines the signal to noise ratio, SNR, of the user. If the SNR is lower than a desired threshold the base station orders the mobile terminal to raise the transmit power. If the SNR is higher than a desired threshold the base station orders the mobile terminal to lower the transmit power.

A significant part of the closed loop power control mechanism is the specification of a fixed power step size. Each power adjustment command orders the mobile terminal to either raise or lower its output power with 1 dB. The 1 dB fixed change per power order command is chosen based on a compromise of different radio environments, ranging from a stationary mobile terminal to a high speed vehicle and of different channel types.

If the signal quality changes quickly it is necessary for the power control mechanism to follow these variations, i.e. if the signal quality goes down a power command ordering the transmitter to raise the used output power should be issued. The 1 dB fixed change per power order command then causes problems, since, if the power step size is too large, i.e. the quantization is too small, unnecessary fluctuations occur around the desired power level causing unnecessary interference. If, on the other hand, the power step size is too small the power control mechanism is not capable of following fast variations in signal quality, since the required number of necessary power order commands grows too large, i.e. the slew rate is not large enough.

In WO-9726716 is described a method of dynamically controlling the power step size in such a way that, on the basis of the power order commands to be examined, a calculation is made of the number of two successive commands in different directions in proportion to the total number of commands during a specific time period. The calculated proportion is then compared to a reference value and the power step size is changed according to this comparison.

In WO-9851026 is described a method where the power step size is changed in discrete steps, e.g. 0.25, 0.50 and 1.00 dB based on system conditions, such as the speed of the mobile terminal.

The general problem with the currently known approaches is that the possibilities of adjusting the power step size are too coarse and that the methods are not robust enough against errors in the signalling channel, which can cause power drift between the actually used output power and the desired output power.

SUMMARY OF THE INVENTION

The present invention deals with the problem of how to achieve an adaptive power control method that is robust against errors in the signalling channel and at the same time reacts quickly to fast fading variations.

One way of realising a power control, which reacts quickly to fast fading variations, is to delta-modulate the desired power, that is, transmitting simple power commands on an in-band signalling channel that order the mobile terminal or the base station to either raise or lower its respective output power. In order to avoid large control loop delays these power commands should be transmitted without channel encoding and outside any interleaving. This implies that there will be bit errors in the power commands. The delta-modulation must therefore be robust to errors and at the same time able to react quickly to fading variations.

Thus, an object of the present invention is to realise a power control method in such a way that no strong fluctuations occur around the desired power level and that it is robust against errors and still capable of reacting quickly to, and following fast fading variations.

This object is achieved according to the invention by means of a fast power control method, in which method the desired power change is calculated by means of an adaptive algorithm, with channel quality and estimated previously used output power as input data. Power drift, caused by bit errors in the in-band signalling channel, between the desired output power and the actually used output power is reduced by multiplying the estimated previously used output power value with a "forgetting function", with values between 0 and 1, reducing the influence of the estimated previously used power outputs. Finally, at the receiving end the new output power from the transmitter is calculated.

In a first embodiment of the invention the average power step size is made dependent of the time correlation of channel quality. If the correlation of channel quality is high the power step size could be larger than if the correlation of channel quality is low, since the behaviour of the channel then is more uncertain.

In a second embodiment of the invention the "forgetting function" $\lambda$ is made dependent on the time correlation of channel quality. If the correlation of channel quality is high the "forgetting function" $\lambda$ should be large to give old values higher impact resulting in a faster system. If, on the other hand, the correlation of channel quality is low the "forgetting function" $\lambda$ then should be made small to reduce the impact of old power values since the channels behaviour is uncertain.

In a third embodiment of the invention the power step size is dependent on the soft value of the power order command. If the soft value indicates a large probability for bit errors the power step size should be small and if the soft value indicates a low probability for bit errors the power step size should be larger since the power order then is more reliable.

In a fourth embodiment of the invention the "forgetting function" $\lambda$ is made dependent on the soft value of the power command. If the soft value indicates a large probability for bit error the forgetting function $\lambda$ should be made small and if the soft value indicates a low probability for bit error the "forgetting function" $\lambda$ should be made large.

In a fifth embodiment of the invention the power step size is made indirectly dependent on channel quality by defining an area within which a difference between the desired output power and a long term mean value of the desired output power is allowed to change.

By using the proposed power control method a fast power control is achieved with long-term robustness and good adaptability to the variations in the in-band signalling channel.

The term "comprises/comprising" when used in this specification is taken to specify the presence of stated features, integers, steps or components but does not preclude the presence or addition of one or more other features, integers, steps, components or groups thereof.

The invention will now be described in more detail with reference to preferred exemplifying embodiments thereof and also with reference to the accompanying drawings.

DETAILED DESCRIPTION

A preferred embodiment of the method according to the invention will be described by using a CDMA-system as an example without being restricted to that. For example, traditional systems like TDMA (Time Division Multiple Access) and TDD (Time Division Duplex) also have power control methods that should benefit from this inventive idea. In e.g. TDMA, power control commands could be sent every burst creating an in-band signalling channel for transmitting the power order commands on. The following is also assuming power control on the reverse link. The proposed algorithm may, as is easily understood by a person skilled in the art, also be realised for power control on the forward link. In that case it is the mobile terminal that delta modulates the radio channel quality instead of the base station delta modulating the received power.

Figure 1:
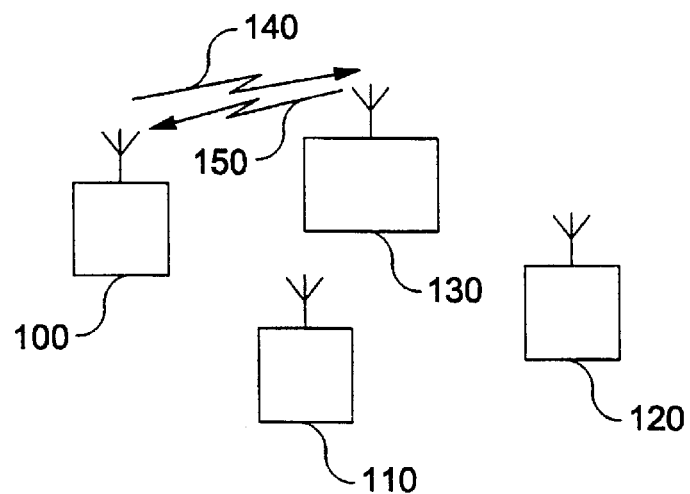
FIG. 1 shows a radio system to which the method of the invention can be applied.

FIG. 1 shows a schematic picture of a CDMA cellular radio communication system to which the invention preferably can be applied. The system comprises several base stations 130 communicating with mobile terminals 100–120 located within its area of coverage. From each mobile terminal 100–120 to its respective base station 130 is a reverse link 140 established and from the base station 130 to its respective mobile terminals 100–120 is a forward link 150 established. A closed loop power control is achieved by transmitting power commands on the forward link 150 or on the reverse link 140 ordering the mobile terminal 100–120 or the base station 130 to raise or lower its output power.

In the following a closed loop reverse link power control method, according to the invention, is described while referring to FIGS. 2–10.

Figure 2:
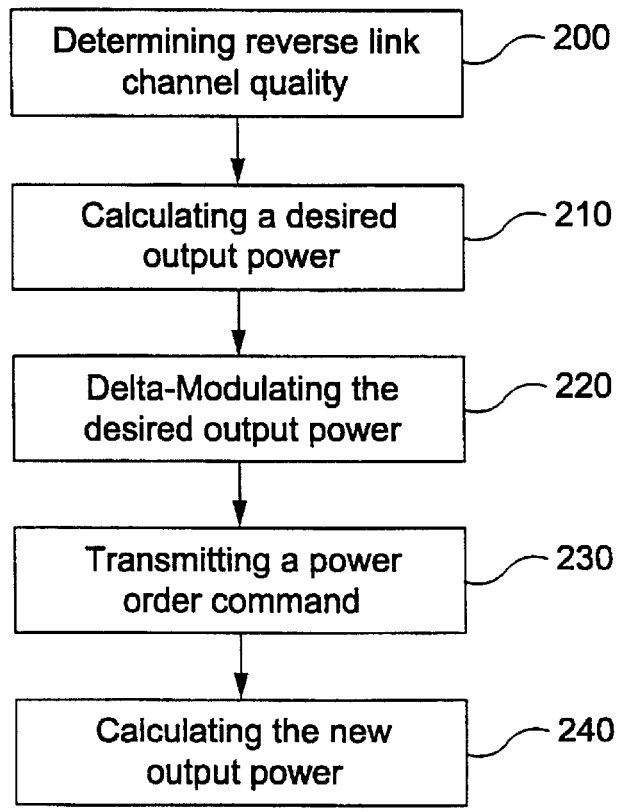
FIG. 2 shows a flowchart describing the power control method.

FIG. 2 shows a flowchart of the power control method according to the invention. In the first step 200 the quality Q of signals received from the mobile terminal on the reverse link is determined in the base station. This may for example be done by a mapping of values from the Rake-receiver to a C/I (Carrier-to-Interference) value in dB. The resulting channel quality Q is then used to calculate in the base station the desired output power $\tilde{P}_n$ 210 from the mobile terminal through an iterative formula. The reverse link channel quality $Q_{n-1}$ and the estimated previously used output power $\hat{P}_{n-1}$ from the mobile terminal are used as input to the iterative formula according to the relationship:

$$\tilde{P}_n = \alpha - \beta \cdot (Q_{n-1} - \tilde{P}_{n-1})(\text{dB})$$

In this iterative formula the constant a sets an average power level in the system and $\beta$ is a function that determines the amount of feedback of estimated previously used output power values $\hat{P}_{n-1}$ from the mobile terminal in relation to channel quality $Q_{n-1}$. Thus, the desired output power $\tilde{P}_n$ is calculated on basis of the actual quality $Q_{n-1}$ on the channel, and not compared to an SNR threshold as in prior art solutions. In a preferred embodiment, $\alpha$ and $\beta$ have the values $\alpha=-5$ dB and $\beta=0,7$, but other values are, of course, possible.

After the desired output power $\tilde{P}_n$ from the mobile terminal has been calculated in the base station it is delta-modulated 220, i.e. it is determined whether the desired output power $\tilde{P}_n$ is lower or higher compared to the estimated previously used output power $\hat{P}_{n-1}$ from the mobile terminal according to the relationship:

$$TPC = \text{sign}(\tilde{P}_n - \hat{P}_{n-1})$$

The TPC (Transmit Power Command) can take two values, one value indicating that the mobile terminal should raise its output power and one value indicating that the mobile terminal should lower its output power. A power order command ordering the mobile station, depending on the TPC, to either raise or lower its output power, is then transmitted from the base station 230, to the mobile terminal.

To avoid control loop delays the power order command is transmitted without channel encoding and outside any interleaving and may thus be subject to bit errors. The base station therefore cannot know what direction the mobile terminal will take and the output power from the mobile terminal is thus estimated according to the relationship:

$$\hat{P}_n = \Delta p \cdot TPC + \lambda \cdot \hat{P}_{n-1} + (1-\lambda) \cdot P_0 \text{(dB)}$$

In this iterative formula $\lambda$ is a "forgetting function" reducing the influence of the estimated previously used output power $\hat{P}_{n-1}$ from the mobile terminal and $\Delta p$ is an adjustable power step size function. The "forgetting function" $\lambda$ is used in order to avoid power drift between the desired output power $\tilde{P}_n$ and the actually used output power $P_n \cdot P_0$ is a constant power value, assigned based on system conditions.

The mobile terminal, on the other hand, does not know the actual value of the TPC. Instead an estimate $\overline{TPC}$ of the transmitted TPC value is used in the mobile terminal. To make the mobile terminal and the base station utilise the same values of $\Delta p$ and $\lambda$ a value $q_{\overline{TPC}}$ may be returned to the base station which is used to calculate $\Delta p$ and $\lambda$. The values of $\Delta p$ and $\lambda$ are then transmitted to the mobile terminal. When calculating the new output power 240 the value of $\overline{TPC}$ together with the actual value of $P_{n-1}$ is used. The calculation is performed according to the relationship:

$$P_n = \Delta P \cdot \overline{TPC} + \lambda \cdot P_{n-1} + (1-\lambda) \cdot P_0 \text{(dB)}$$

where the values of $\Delta p$ and $\lambda$, as said, are provided by the base station so that the base station and the mobile terminal utilise the same values in the respective calculation.

Figure 3:
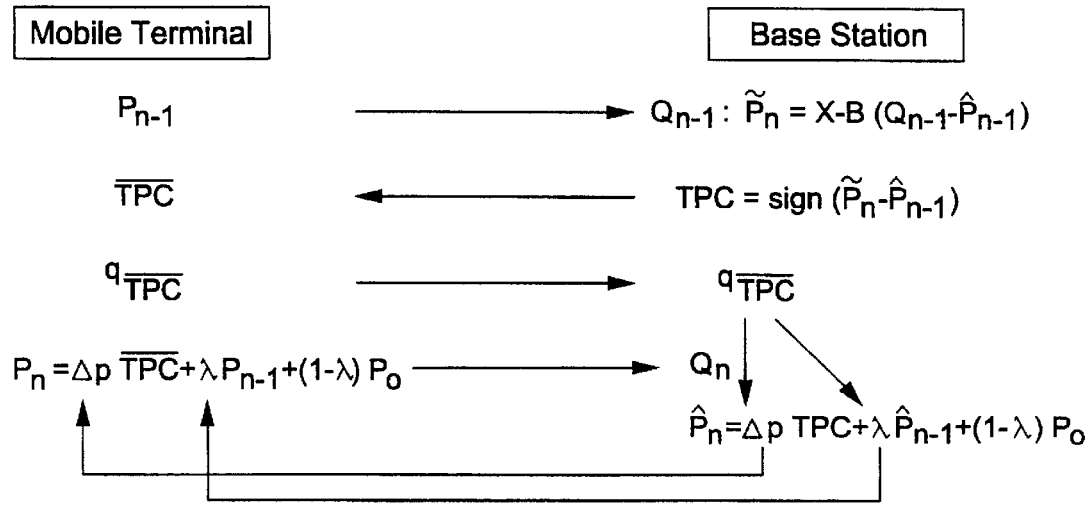
FIG. 3 shows a summary of the different calculations in the method.

Referring now to FIG. 3 a summary is made regarding where the different calculations are performed. In the base station is first the quality $Q_{n-1}$ of the received signal from the mobile terminal determined. The value $Q_{n-1}$ is then used to calculate the desired output power $\tilde{P}_n = \alpha - \beta \cdot (Q_{n-1} - \hat{P}_{n-1})$ from the mobile terminal. A power order command TPC is calculated in the base station and transmitted to the mobile terminal. The mobile terminal receives an estimate $\overline{TPC}$ of TPC and returns a value $q_{\overline{TPC}}$ that is used in the base station to calculate $\Delta p$ and $\lambda$. The new output power is calculated in the mobile terminal according to $P_n = \Delta p \cdot \overline{TPC} + \lambda \cdot P_{n-1} + (1-\lambda) \cdot P_0$. In the base station signals are received with the new output power $P_n$ and the quality $Q_n$ is determined. The base station also calculates an estimate $\hat{P}_n = \Delta p \cdot TPC + \lambda \cdot P_{n-1} + (1-\lambda) \cdot P_0$ of the power used in the mobile terminal.

Usually power control methods in CDMA systems try to achieve a constant C/I in all possible situations. Hence, for links with a very small path loss the output power is very small and when the path loss is high the output power is high. The iterative formula $\tilde{P}_n = \alpha - \beta \cdot (Q_{n-1} - \hat{P}_{n-1})$ with a value of $\beta$ between 0 and 1 implies however, that mobile terminals experiencing a small path loss are allowed to transmit with a larger output power than calculated in the open loop control and mobile terminals experiencing a large path loss have to transmit with a smaller power than calculated in the open loop power control. This increases the robustness for links experiencing a small path loss towards sudden interference peaks and limits the output power for the largest system interferers. Thus, the total system interference is reduced.

Figure 4:
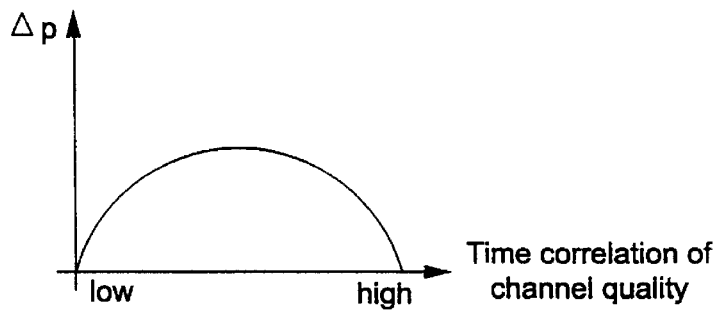
FIG. 4 illustrates the relationship between the power step size $\Delta p$ and the time correlation of channel quality.

In a preferred embodiment of the invention the time correlation of channel quality sets the average level of the power step size $\Delta p$, i.e. determines the size of the power step $\Delta p$. In FIG. 4 is $\Delta p$ shown as a function of time correlation of the channel quality. At low time correlation of the estimated channel quality, i.e. when there are large differences in estimated quality between two time instances on the channel, the average power step size $\Delta p$ should be small to reduce fluctuations in output power. When the time correlation of estimated channel quality is high, i.e. when the estimated channel quality is similar between two time instances, the average power step size $\Delta p$ should be larger to react faster to changes in the channel. However, when the correlation is very high the output power should already be very close to the desired output power and thus the average power step size $\Delta p$ should be made small again. For example, frequency hopping systems have lower time correlation of channel quality compared to systems without frequency hopping.

Figure 5:
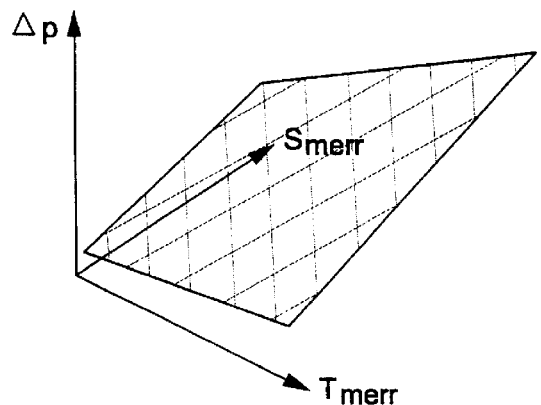
FIG. 5 illustrates the relationship between the power step size $\Delta p$ and measurement errors in the channel quality.

The changes in time correlation of channel quality could also depend on measurement errors. Referring to FIG. 5 $\Delta p$ is shown as a function of the correlation of the measurement errors $\rho_{merr}$ and the variations in measurement errors $\sigma_{merr}$. When the correlation of measurement errors $\rho_{merr}$ is high and the variation in measurement errors $\sigma_{merr}$ is low $\Delta p$ should be made large, since the channel behaves similar between two time instances. When the variation in measurement errors $\sigma_{merr}$ grows and $\rho_{merr}$ is still high $\Delta p$ should be larger, since the channel variations are larger. On the other hand, when the correlation of measurement errors $\rho_{merr}$ is low and the variation in measurement errors $\sigma_{merr}$ is low $\Delta p$ should be made small, since the knowledge of the next state of the channel is unceertain. When the variation in measurement errors $\sigma_{merr}$ grows larger and $\rho_{merr}$ is still low $\Delta p$ should be made a little bit larger but still small since the behaviour of the channel is uncertain. This leads to lower variations in output power and thus to less interference.

Figure 6:
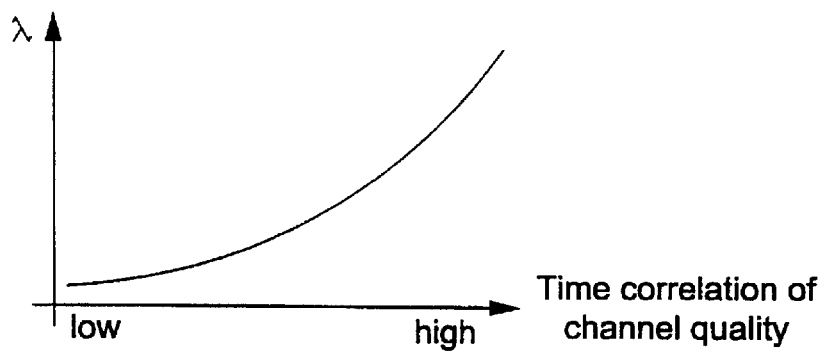
FIG. 6 illustrates the relationship between the "forgetting function" $\lambda$ and the time correlation of channel quality.

FIG. 6 shows the "forgetting function" $\lambda$ as a function of time correlation of the channel quality. At low time correlation of the channel quality, i.e. when there are large differences in quality between two time instances on the channel, the forgetting factor $\lambda$ should also be low, i.e. reducing the impact of the previously used output power to reduce fluctuations in output power. When the time correlation of channel quality is high, i.e. when the channel quality is similar between two time instances, the "forgetting function" $\lambda$ should be large so that old values have greater impact on the system and it thus can react faster to quality changes in the channel.

Figure 7:
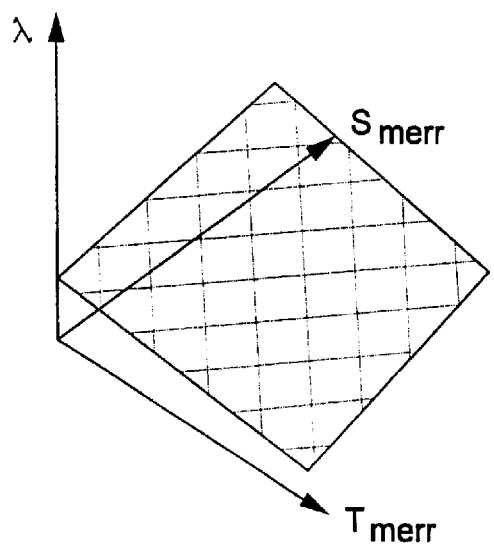
FIG. 7 illustrates the relationship between the "forgetting function" $\lambda$ and measurement errors in the channel quality.

Measurement errors in the channel quality affect also the "forgetting function" $\lambda$. In FIG. 7 is the "forgetting function" $\lambda$ shown as a function of correlation of the measurement errors $\rho_{merr}$ and the variations in measurement errors $\sigma_{merr}$. When the correlation of measurement errors $\rho_{merr}$ is high and the variation in measurement errors $\sigma_{merr}$ is low $\lambda$ should be made large, since the channel behaves similar over time. When the variation in measurement errors $\sigma_{merr}$ grows and $\rho_{merr}$ is still large, $\lambda$ is made a little bit smaller but should still be large, since the channel variations are larger. On the other hand, when the correlation of measurement errors $\rho_{merr}$ is low and the variation in measurement errors $\sigma_{merr}$ is low $\lambda$ should be made small, since the knowledge of the next state of the channel is uncertain. When the variation in measurement errors $\sigma_{merr}$ grows larger and $\rho_{merr}$ is still low, $\lambda$ should be made a little bit larger but should still be small since the behaviour of the channel is uncertain. This leads to lower variations in output power and thus to less interference.

Figure 8:
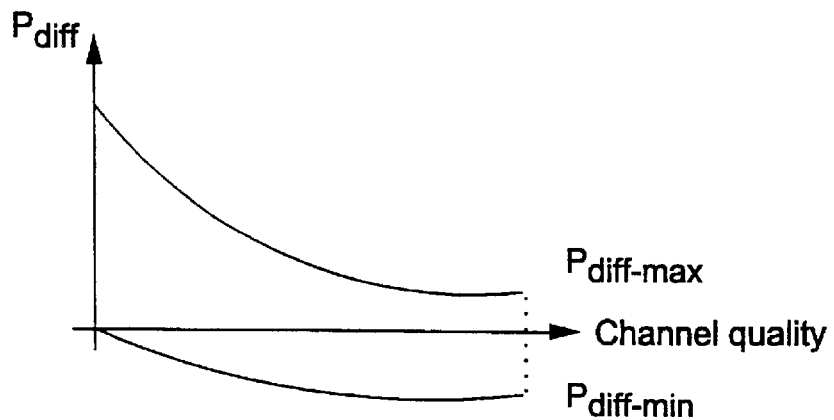
FIG. 8 illustrates the relationship between $P_{diff\text{-}max}$ and channel quality.

In FIG. 8 is yet another embodiment of the invention shown where the power step size $\Delta p$ is made dependent on a long-term mean value $P_{mean}$ of the desired output power $\tilde{P}_n$. If the delta-modulation results in a desired output power $\tilde{P}_n$ that differs too much from the long-term mean value $P_{mean}$, a power change in that direction is ignored. The difference between the long-term mean value $P_{mean}$ and the desired output power $\tilde{P}_n$ is defined as:

$$P_{diff}=\tilde{P}_n-P_{mean}(\text{dB})$$

$P_{diff}$ should preferably be made a function of current channel quality Q and be different depending on if $P_{diff}$ is positive or negative. $P_{diff}$ should also be bound by a maximum value $P_{diff\text{-}max}$ when the difference is positive and a value $P_{diff\text{-}max}$ when the difference is negative. In FIG. 8 an allowed area is represented between the two curves representing $P_{diff\text{-}max}$ and $P_{diff\text{-}max}$. When the channel quality Q is low, a larger difference in $P_{diff}$ should be accepted to manage deep dips in e.g. C/I, but values of $P_{diff}$ outside the area between the two curves representing $P_{diff\text{-}max}$ and $P_{diff\text{-}max}$ should be ignored, i.e. a power change that results in a value outside the two curves are not performed. This results in reduced fluctuations in used output power.

Figure 9:
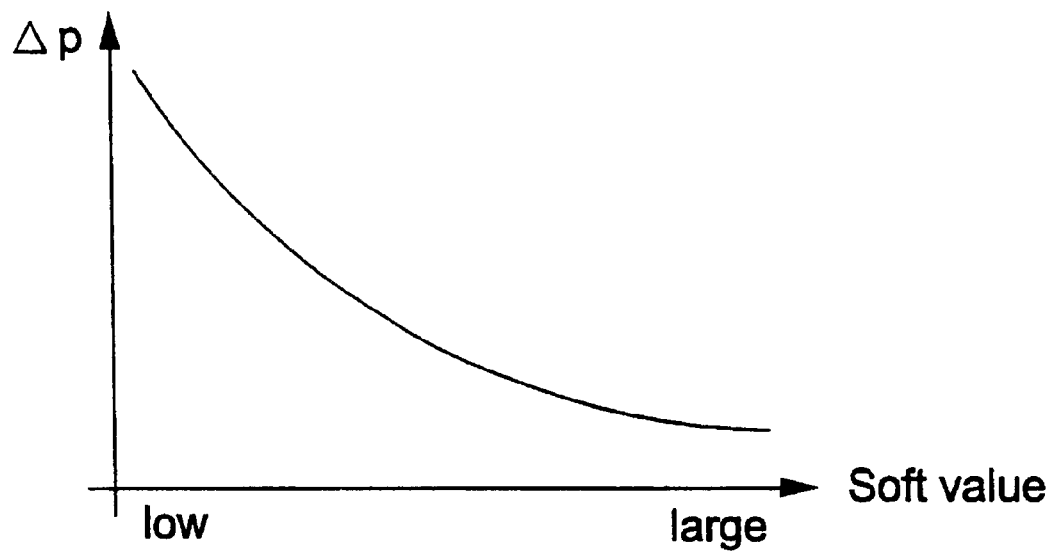
FIG. 9 illustrates the relationship between the power step size $\Delta p$ and the soft value of the power order command.

FIG. 9 shows the average power step size $\Delta p$ as a function of the soft value of the power order command. If the soft value indicates a large probability of bit error the risk of error in the power order is large. The power step size should therefore be small to reduce fluctuations in used output power. If the soft value instead indicates a low probability of bit error the power step size can be larger, thus reacting faster to changes in the channel.

Figure 10:
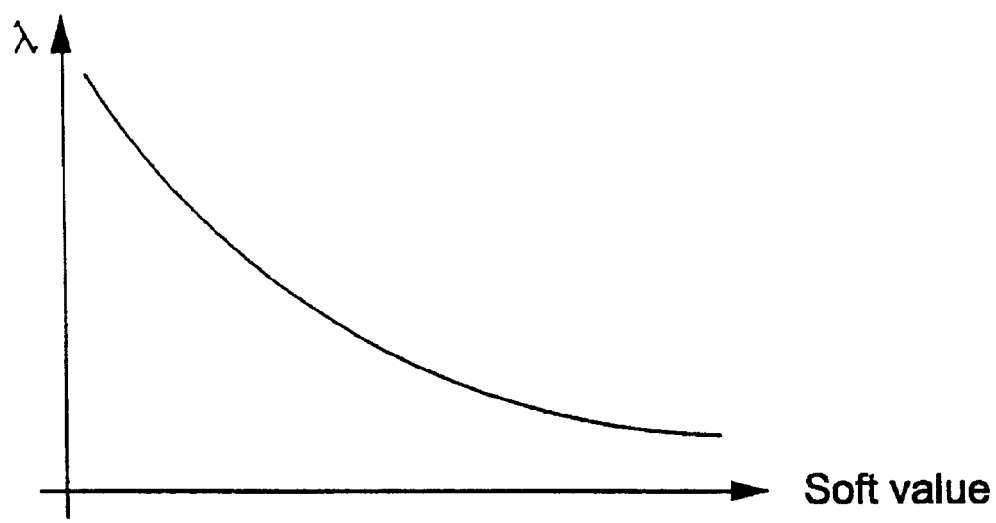
FIG. 10 illustrates the relationship between the "forgetting function" $\lambda$ and the soft value of the power order command.

FIG. 10 shows the "forgetting function" $\lambda$ as a function of the soft value of the power order command. If the soft value of the power order command indicates a large probability of bit error the "forgetting function" $\lambda$ should be low, i.e. reducing the influence of the previously used output power value to reduce fluctuations in output power. When the soft value instead indicates a low probability of bit error the "forgetting function" $\lambda$ should be high giving old power values higher impact so that the system can react faster to quality changes in the channel.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method of controlling transmitting power in a cellular radio communication system comprising one or several transmitters each communicating with receivers located within its respective area of coverage the method characterised by the following steps determining in the receiver the quality (Q) of signals received from the transmitter;

calculating in the receiver a desired output power level ($\tilde{P}_n$) from the transmitter as a function of estimated previously used output power ($\hat{P}_{n-1}$) from the transmitter in relation to channel quality ($Q_{n-1}$) from the transmitter to the receiver;

delta-modulating in the receiver the desired output power ($\tilde{P}_n$) by comparing it with the estimated previously used output power ($\hat{P}n-1$) from the transmitter to determine a power order command;

transmitting the power order command to the transmitter ordering it to either raise or lower its output power; and calculating in the transmitter its new output power dependent on the received power order command, a power step size function ($\Delta p$), previously used output power ($P_{n-1}$) and a forgetting function ($\lambda$).

2. The method of claim 1 further characterised in making the average power step size function ($\Delta p$) a function of time correlation of the channel quality (Q) from the transmitter to the receiver.

3. The method of claim 1 further characterised in determining in the transmitter the reliability of the power order command;

making the average power step size function ($\Delta p$) a function of the reliability of the received power order command.

4. The method of claim 1 further characterised in determining the difference $P_{diff}=\tilde{P}_n-P_{mean}$ where $P_{mean}$ is a long term mean value of the desired output power $\tilde{P}_n$; and making the maximum of $P_{diff}$ a function of channel quality (Q) from the transmitter to the receiver.

5. The method of claim 1 further characterised in making the forgetting function ($\lambda$) a function of time correlation of the channel quality (Q) from the transmitter to the receiver.

6. The method of claim 1 further characterised in making the forgetting function ($\lambda$) a function of the reliability of the received power order command.

7. The method of claim 1 further characterised in calculating the desired output power ($\tilde{P}_n$) in accordance with the relationship $$\tilde{P}_n=\alpha-\beta\cdot(Q_{n-1}-\hat{P}_{n-1})(\text{dB})$$

where $\alpha$ sets an average power level in the system and $\beta$ is a function which determines a feedback of estimated previously used output power ($\hat{P}n-1$) from the receiver in relation to channel quality ($Q_{n-1}$) from the transmitter to the receiver.

8. The method of claim 1 further characterised in delta-modulating the desired output power ($\tilde{P}_n$) in accordance with the relationship $$TPC=\text{sign}(\tilde{P}_n-\hat{P}_{n-1})$$

where $\hat{P}_{n-1}$ is estimated previously used output power from the transmitter.

9. The method of claim 1 further characterised in calculating the new output power in accordance with the relationship $$P_n=\Delta p\cdot\overline{TPC}+\lambda\cdot P_{n-1}+(1-\lambda)\cdot P_0(\text{dB})$$

where $\overline{TPC}$ is the received power order command and $\lambda$ is a forgetting function reducing the influence of previously used output power $P_{n-1}$ and $\Delta p$ is an adaptable power step size function.

10. The method of claim 1 further characterised in determining the reliability of the power order command by checking the soft value of the power order command as it is received in the transmitter.

* * * * *